United States Patent
Dietl et al.

(10) Patent No.: US 9,505,969 B2
(45) Date of Patent: *Nov. 29, 2016

(54) VAPOR SPACE ANTICORROSIVE COMPOSITION

(71) Applicant: BASF SE, Ludwigshafen (DE)

(72) Inventors: Harald Dietl, Luwigshafen (DE); Uwe Nitzschke, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,572

(22) Filed: Nov. 25, 2015

(65) Prior Publication Data

US 2016/0075930 A1    Mar. 17, 2016

Related U.S. Application Data

(63) Continuation of application No. 13/866,276, filed on Apr. 19, 2013, now Pat. No. 9,228,127.

(60) Provisional application No. 61/638,506, filed on Apr. 26, 2012.

(51) Int. Cl.
   *C09K 15/22*   (2006.01)
   *C09K 5/10*    (2006.01)
   *C09K 5/20*    (2006.01)
   *C23F 11/02*   (2006.01)

(52) U.S. Cl.
   CPC . *C09K 5/10* (2013.01); *C09K 5/20* (2013.01); *C09K 15/22* (2013.01); *C23F 11/02* (2013.01)

(58) Field of Classification Search
   None
   See application file for complete search history.

(56) References Cited

U.S. PATENT DOCUMENTS

| | | | |
|---|---|---|---|
| 3,203,904 A | 8/1965 | Brown | |
| 3,239,470 A | 3/1966 | Michal | |
| 3,860,430 A | 1/1975 | Walker et al. | |
| 4,481,125 A | 11/1984 | Holgado | |
| 4,552,686 A | 11/1985 | Morris-Sherwood et al. | |
| 5,178,786 A * | 1/1993 | Jahnke | C10M 141/06 252/392 |
| 2012/0172277 A1 | 7/2012 | Schacht et al. | |

FOREIGN PATENT DOCUMENTS

| | | |
|---|---|---|
| EP | 0 275 651 A1 | 7/1988 |
| EP | 0 414 398 A1 | 2/1991 |
| EP | 1 111 092 A1 | 6/2001 |
| EP | 2010 0190743 | 11/2010 |
| WO | WO 02/051957 A1 | 7/2002 |
| WO | WO 2012/063164 A1 | 5/2012 |
| WO | WO 2012/093372 A2 | 7/2012 |

OTHER PUBLICATIONS

International Search Report and Written Opinion issued Sep. 30, 2013, in PCT/EP2013/057434 filed Apr. 10, 2013.

* cited by examiner

*Primary Examiner* — Necholus Ogden, Jr.
(74) *Attorney, Agent, or Firm* — Oblon, McClelland, Maier & Neustadt, L.L.P.

(57) ABSTRACT

The present invention refers to a vapor space anticorrosive composition comprising corrosion inhibitors, surfactants and possibly thickeners, wherein one surfactant is selected from alkylamine ethoxylates, and being useful as an engine run-in composition and as a coolant.

6 Claims, No Drawings

VAPOR SPACE ANTICORROSIVE COMPOSITION

CROSS REFERENCE TO RELATED APPLICATION(S)

The present application is a continuation of U.S. patent application Ser. No. 13/866,276, filed on Apr. 19, 2013, the text of which is incorporated herein by reference and which claims priority to U.S. provisional application Ser. No. 61/638,506, filed Apr. 26, 2012, the text of which is incorporated herein by reference.

The present invention relates to a vapor space anticorrosive composition and a vapor space anticorrosive composition formulation comprising at least one corrosion inhibitor and at least one special surfactant.

Furthermore, the use of the said vapor space anticorrosive composition as an engine running-in composition or in a coolant and a process of manufacturing an engine running-in composition and a coolant from such vapor space anticorrosive composition formulation have been found.

Corrosion protection of objects has to meet evermore demanding requirements. At the same time, corrosion protection has not been satisfactorily solved for numerous applications. In particular, corrosion protection of objects which have hollow spaces is in need of improvement.

Particular problems occur when an object comes into contact with a liquid such as water or the liquid is drained or removed. Afterward, the object is often exposed to air without protection and corrodes. The corrosion is frequently promoted by residues of the liquid which remain in the object concerned and can form a corrosive atmosphere.

This applies, inter alia, to engines which are briefly filled with engine running-in compositions for test operation. Coolant is in practice frequently used as engine running-in composition. After conclusion of the test, the engine running-in composition is drained again. A relatively small proportion of the engine running-in composition generally remains in the system. This accelerates corrosion of the engine in the vapor space which can corrode without protection.

EP 1 111 092 A1 describes aqueous coolants comprising salts of benzoic acids for the running-in phase of engines and their use as vapor space corrosion inhibitor.

WO 02/051957 describes aqueous coolants comprising ammonium salts of a $C_1$-$C_4$-monocarboxylic or -dicarboxylic acid which may have one or more OH substituents and their use as vapor space corrosion inhibitor.

European application File No. 10190743.4 describes a vapor space anticorrosive composition useful as an engine run-in composition or as a coolant, comprising a corrosion inhibitor such as an ethoxylate of castor oil, a thickener such as a polyacrylate and a surfactant such as a polyether. Such polyether is preferably an unmixed polyalkylene oxide, preferably a $C_2$-$C_4$-alkylene oxides or a phenyl-substituted $C_2$-$C_4$-alkylene oxide, in particular a polyethylene oxide, a polypropylene oxide or a poly(phenylethylene oxide) or a block copolymer or a random copolymer of these alkylene oxides. Such polyalkylene oxide can be prepared by polyaddition of the alkylene oxides onto starter molecules such as saturated or unsaturated aliphatic or aromatic alcohols, saturated or unsaturated aliphatic or aromatic amines, saturated or unsaturated aliphatic carboxylic acids or carboxamides. Such polyether can comprise from 1 to 300 moles, preferably from 3 to 150 moles, of alkylene oxide per mole of starter molecule.

It was an object of the present invention to provide a vapor space anticorrosive composition and a vapor space anticorrosive composition formulation which have corrosion-inhibiting properties, can be handled easily and provide good corrosion protection even after the major part of the medium comprising the vapor space anticorrosive composition has been drained or removed.

We have accordingly found a vapor space anticorrosive composition comprising at least one corrosion inhibitor and at least one surfactant, wherein the at least one surfactant is selected from alkyl amine ethoxylates.

The term vapor space refers to the space in a hollow body which is located above a liquid or is physically connected to the space via a liquid.

Suitable corrosion inhibitors are all materials which can reduce or completely prevent corrosion of objects.

Suitable objects which can be protected by means of the vapor space anticorrosive composition of the invention can be made entirely or partly of any materials which can be subject to corrosion. Suitable objects can be made, for example, of metal, plastics, wood or cellulose.

Suitable objects are preferably made entirely or partly of metal. In many cases, the metal of which the suitable objects are made comprises iron, steel, aluminum, magnesium, titanium, vanadium, chromium, manganese, cobalt, nickel, copper, zinc, molybdenum or tungsten. Particularly suitable objects are entirely or partly made of metal comprising iron.

In a preferred embodiment of the invention, suitable objects have at least one hollow space which is not completely filled with a liquid.

In a particularly preferred embodiment, suitable objects have at least one hollow space which entirely or partly has a metallic surface.

One class of suitable corrosion inhibitors is, for example, salts of benzoic acids. Preference is given to ammonium salts or salts of alkali metals or alkaline earth metals. Particular preference is given to sodium or ammonium salts. The anions of benzoic acid can be those of unsubstituted or substituted benzoic acid. Examples of substituents on the aromatic ring of benzoic acid are alkyl radicals, in particular methyl, ethyl, n-propyl, isopropyl, n-butyl, tert-butyl and isobutyl. These groups may optionally be substituted further. The benzoic acid can be monosubstituted or bear a plurality of substituents. Preference is given to unsubstituted benzoic acid or monosubstituted benzoic acid.

Another class of suitable corrosion inhibitors is ammonium salts of monocarboxylic or dicarboxylic acids. Preference is given to ammonium salts of $C_1$-$C_{12}$-monocarboxylic or $C_2$-$C_{12}$-dicarboxylic acids. Particular preference is given to salts of $C_4$-$C_{12}$-monocarboxylic or -dicarboxylic acids. The monocarboxylic or dicarboxylic acids can comprise one or more substituents. In particular, they can have one or more OH groups.

A further class of suitable corrosion inhibitors is nitrogen-heterocyclic compounds which are preferably aromatic. Suitable nitrogen-heterocyclic compounds can bear one or more substituents. In a preferred variant, they are fused with other aromatic rings. Preferred nitrogen-heterocyclic compounds are, for example, azoles. Particular preference is given to triazoles or thiazoles. Examples of suitable azoles are benzoazoles and toluazoles. Examples of suitable triazoles are benzotriazole and tolutriazole. Examples of suitable thiazoles are benzothiazoles and 2-mercaptobenzothiazoles.

Further suitable corrosion inhibitors are phosphates. These are first and foremost salts of phosphoric acid. Suitable phosphates are formed, for example, by adjusting the pH of an aqueous solution of phosphoric acid by means of bases. In principle, all bases which form soluble salts in the anticorrosive composition are suitable for adjusting the pH. Preferred bases are alkali metal hydroxides such as sodium or potassium hydroxide. Phosphates are preferred as corrosion inhibitor when, inter alia, particularly low-lime water is employed during use.

Further suitable corrosion inhibitors are nitrites such as sodium or potassium nitrite. Phosphates are frequently combined with nitrates.

Water-soluble secondary or tertiary amines are likewise suitable as corrosion inhibitors. Examples of this class of corrosion inhibitors are diethanolamine and triethanolamine.

In one embodiment, vapor space anticorrosive compositions according to the invention comprise at least one corrosion inhibitor which in the system with the other constituents has a suitable phase inversion temperature $T_P$. This means that the constituents are present in solution below the phase inversion temperature, but form a second liquid phase above the phase inversion temperature. The phase inversion temperature is characterized by the temperature at which turbidity appears on heating the vapor space anticorrosive composition. This is also referred to as cloud point. Such corrosion inhibitors surprisingly provide improved corrosion protection.

In general, the corrosion inhibitor is selected so that the phase inversion temperature is below or approximately equal to the temperature reached by the vapor space anticorrosive composition during use.

If vapor space anticorrosive compositions according to the invention are used as engine run-in compositions, a suitable phase inversion temperature is, for example, from 50 to 100° C., preferably from 70 to 90° C., in each case determined in accordance with DIN 53917.

Examples of corrosion inhibitors which have a suitable phase inversion temperature in aqueous vapor space anticorrosive compositions are, for example, esters of polyhydric alcohols and carboxylic acids. Suitable polyhydric alcohols are, for example, diols, triols or tetrols, which may optionally be alkoxylated and can have been produced petrochemically or on the basis of renewable raw materials. Suitable esters generally have a molar mass of not more than 10,000 g/mol, preferably less than 5,000 g/mol and particularly preferably less than 2,000 g/mol. In one embodiment, suitable esters still bear unesterified alcohol or carboxylic acid groups.

Further suitable corrosion inhibitors are polyethers of fatty alcohols. These can have been produced entirely petrochemically or entirely or partially on the basis of renewable raw materials. In general, they are alkoxylates, preferably ethoxylates. Vapor space anticorrosive compositions according to the invention particularly preferably comprise polyethers of fatty alcohols which comprise from 2 to 200 moles of ethylene oxide ("EO") per mole. In particular, polyethers of fatty alcohols comprise from 4 to 100 moles of EO per mole or from 5 to 60 moles of EO per mole. Polyethers of fatty alcohols can also comprise further alkylene oxides such as propylene oxide, butylene oxide and/or styrene oxide in varying amounts in addition to EO. In general, suitable polyethers of fatty alcohols have hydroxyl numbers in accordance with DIN 53240 of from 10 to 500, preferably from 20 to 200. In one embodiment, the hydroxyl number is from 30 to 100, in another embodiment from 110 to 180.

A preferred corrosion inhibitor which has a suitable phase inversion temperature in aqueous vapor space anticorrosive compositions is alkoxylated castor oil. This is preferably ethoxylated. Vapor space anticorrosive compositions according to the invention particularly preferably comprise ethoxylated castor oil comprising from 2 to 200 moles of EO per mole. In particular, ethoxylated castor oil comprises from 4 to 100 moles of EO per mole or from 5 to 60 moles of EO per mole. Alkoxylated castor oil can also comprise further alkylene oxides such as propylene oxide, butylene oxide and/or styrene oxide in varying amounts in addition to EO. The solubility in water and the phase inversion temperature can be influenced via the degree of alkoxylation of the castor oil and optionally the ratio of the various alkylene oxides.

Vapor space anticorrosive compositions according to the invention frequently comprise additives which stabilize the pH and thus likewise contribute to inhibition of corrosion. In one embodiment, vapor space anticorrosive compositions according to the invention comprise, for example, borax.

Vapor space anticorrosive compositions according to the invention can either comprise only one corrosion inhibitor, but more frequently comprise a combination of various corrosion inhibitors, at least one of them being an alkylamine alkoxylate.

In a preferred embodiment, triazoles are combined with aliphatic and/or aromatic monocarboxylic/dicarboxylic acids or derivatives thereof and also borax.

In another embodiment, benzoates and salicylates are combined with triethanolamine.

The proportion of the at least one corrosion inhibitor in the vapor space anticorrosive composition can vary within wide limits. In choosing the amount of the at least one corrosion inhibitor, it is necessary to take into account, inter alia, the type of corrosion inhibitor, the properties of the object to be protected and especially the application in which the vapor space anticorrosive composition is to be used.

If the vapor space anticorrosive composition according to the instant invention is used as a coolant or an engine run-in composition, the vapor space anticorrosive composition typically comprises from 0.1 to 10% by weight of corrosion inhibitor during use. Preference is given to from 0.2 to 5% by weight, particularly preferably from 0.3 to 1% by weight. In one embodiment, from 0.25 to 0.5% by weight are present, in another from 0.45 to 0.8% by weight.

It is possible for the vapor space anticorrosive composition of the invention to be provided as a concentrate formulation which may have a significantly higher proportion of corrosion inhibitors and is then diluted with water or other solvents before use.

In a preferred embodiment, the vapor space anticorrosive composition of the invention comprises at least one thickener. Thickeners are generally high molecular weight substances which increase the viscosity of a liquid.

In general, suitable thickeners as a 0.5% strength by weight solution in water have a viscosity at 20° C. of at least 50 mPas, preferably 500 mPas, particularly preferably 2000 mPas and in particular at least 5000 mPas (dynamic viscosity, determined as specified in ASTM D 4016-08). All viscosity values referred to herein are as determined in accordance with ASTM D 4016-08, and the manual "Viskositätsmessungen mit Brookfield, Brookfield Engineering Labs. Vertriebs GmbH 9/99". ASTM D 4016-08" describes a method of determining viscosities of particular mortars, which has been applied to the present vapor space anticorrosive compositions. Viscosities which have been determined experimentally in the context of the present invention were all measured on a Brookfield LV DV III+ instrument with small sample adapter and a type SC4-34 spindle).

However, the viscosity of the aqueous 0.5% strength by weight solution is typically not more than 50 000 mPas.

Vapor space anticorrosive compositions according to the invention can comprise, for example, one or more natural thickeners or preferably one or more synthetic thickeners or mixtures thereof.

The choice of thickener depends on the use, the desired viscosity range, the use temperature and the solvent which is to be thickened. The type of thickener is not critical for carrying out the invention as long as the thickener system does not undergo any undesirable interaction with the corrosion inhibitor, the surfactant, the object to be protected or any other constituents present.

Examples of suitable thickeners are, for example, described in Kittel, Lehrbuch der Lacke and Beschichtungen, volume 4, 2nd edition 2007, pp. 285 to 316.

Natural thickeners are thickeners which are natural products or can be obtained by work-up, for example purification operations, in particular extraction, of natural products. Examples of inorganic natural thickeners are sheet silicates such as bentonite. Examples or organic natural thickeners are preferably proteins such as casein or preferably polysaccharides. Particularly preferred natural thickeners are selected from agar agar, carrageenin, gum arabic, alginates such as sodium alginate, potassium alginate, ammonium alginate, calcium alginate and propylene glycol alginate, pectins, polyoses, carob bean gum (carubin) and dextrins.

Preference is given to using synthetic thickeners.

Suitable synthetic thickeners are, for example, partially hydrolyzed polymers and copolymers of vinyl acetate. These preferably have a degree of hydrolysis of from 70 to 97%. Particular preference is given to partially hydrolyzed polyvinyl alcohols and also polyvinyl alcohol itself.

For the purposes of the present invention, copolymers of vinyl acetate as thickeners are, in particular, fully or partially hydrolyzed vinyl alcohol copolymers, in particular fully hydrolyzed copolymers of alkylvinyl esters and vinyl acetate having a proportion of alkylvinyl ester of preferably from 5 to 20 mol-%, very particularly preferably copolymers of alkylvinyl acetate and vinyl acetate. Further possible thickeners are homopolymers and copolymers of N-vinylpyrrolidone.

Further suitable thickeners are homopolymers and copolymers of acrylic acid and methacrylic acid and also salts thereof, esters of acrylic acid or methacrylic acid, acrylamide, vinylpyrrolidone, alkylene oxides such as polyethylene oxides, styrene-maleic anhydride copolymers and salts thereof.

Preferred synthetic thickeners are homopolymers or copolymers comprising acrylic acid. Such polymers will also be referred to as polyacrylates in the present patent application.

In general, suitable polyacrylates are weakly crosslinked.

Particularly preferred thickeners are polyacrylates comprising acrylic acid and acrylamide.

Very particularly preferred synthetic thickeners are selected from copolymers comprising from 85 to 95% by weight of acrylic acid, from 4 to 14% by weight of acrylamide and from 0.01 to 1% by weight of the (meth) acrylamide derivative of the formula

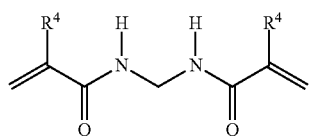

wherein the radicals $R^4$ can be identical or different and can each be methyl or hydrogen.

Suitable synthetic thickeners generally have molecular weights $M_w$, in the range from 50 000 to 3 000 000 g/mol, preferably from 100 000 to 2 000 000 g/mol, particularly preferably from 200 000 to 1 000 000 g/mol (determined by gel permeation chromatography using polystyrene as a standard).

Suitable thickeners in neat form are generally solid. However, they can be used as solution or as dispersion, for example in water.

It is not necessary for the thickeners used to dissolve completely in the other constituents of the vapor space anticorrosive composition at room temperature. The vapor space anticorrosive compositions of the invention are also effective when they have a plurality of phases.

However, it is advantageous for the thickeners used to be able to be stirred readily into the vapor space anticorrosive composition. The thickeners are frequently stirred in at slightly acidic pH, for example at a pH of from 3 to 4.

Furthermore, associative thickeners are suitable as thickeners. Associative thickeners comprise not only hydrophilic groups but also hydrophobic end or side groups in the molecule. Associative thickeners have surfactant character and are generally capable of forming micelles. Suitable associative thickeners are, for example, hydrophobically modified polyacrylates, hydrophobically modified cellulose ethers, hydrophobically modified polyacrylamides, hydrophobically modified polyethers or associative polyurethane thickeners comprising hydrophilic, relatively high molecular weight polyether segments bound via urethane groups and capped with at least two terminal, hydrophobic molecule groups.

A preferred class of thickeners is a system comprising at least one polyacrylate with at least one surfactant. Suitable polyacrylates for such a thickener correspond to the polyacrylates disclosed above.

The vapor space anticorrosive composition and the vapor space anticorrosive composition formulation according to the instant invention comprise one or more alkylamine ethoxylates as the at least one surfactant.

The alkylamine residue may be a secondary or preferably a primary aliphatic monoamine which is capable of being ethoxylated. Usually secondary of preferably primary aliphatic monoamines are used, however, polyamines with with at least one secondary and/or primary amino group which is capable of being ethoxylated may also be used. The alkyl residues to the nitrogen atom normally comprise saturated linear or branched alkyl groups, however, unsaturated linear or branched alkyl residues or saturated or unsaturated cycloalkyl residues may also be comprised by the term "alkyl".

In a preferred embodiment, the said alkylamine ethoxylates comprise at least one linear or branched $C_3$ to $C_{20}$ alkyl chain, preferably at least one linear or branched $C_6$ to $C_{13}$ alkyl chain, more preferably at least one linear or branched $C_7$ to $C_{12}$ alkyl chain, most preferably at least one linear or branched $C_8$ to $C_{11}$ alkyl chain. Preferably, the term "alkyl chain" here means saturated and non-cyclic hydrocarbon residues. The alkylamine ethoxylates may also comprise mixtures of such alkyl chains, for example a mixture of homologue alkyl residues, depending on the specific technical or natural origin of the alkylamines used.

Suitable examples for single alkylamine molecules being capable for ethoxylation and, therefore, suitable as surfactants for the instant invention are n-propylamine, isopropylamine, n-butylamine, isobutylamine, sec-butylamine, tert-butylamine, n-pentylamine, tert-pentylamine, n-hexylamine, n-heptylamine, n-octylamine, 2-ethylhexylamine, n-nonylamine, n-decylamine, 2-propylheptylamine, n-undecylamine, n-dodecylamine, n-tridecylamine, isotridecylamine, n-tetradecylamine, n-pentadecylamine, n-hexadecylamine, n-heptadecylamine, n-octadecylamine, n-nonadecylamine, n-eicosylamine, di-(n-hexyl)amine, di-(n-heptyl)amine, di-(n-octyl)amine, di-(2-ethylhexyl)amine, di-(n-nonyl)amine, di-(n-decyl)amine, di-(2-propylheptyl) amine, di-(n-undecyl)amine, di-(n-dodecyl)amine, di-(n-tridecyl)amine, di-(isotridecyl)amine, di-(n-tetradecyl)amine, di-(n-pentadecyl)amine, di-(n-hexadecyl)amine, di-(n-heptadecyl)amine, di-(n-octadecyl)amine, di-(n-nonadecyl) amine, di-(n-eicosyl)amine, n-hexylmethylamine, n-heptylmethylamine, n-octylmethylamine, (2-ethylhexyl) methylamine, n-nonylmethylamine, n-decylmethylamine, (2-propylheptyl)methylamine, n-undecylmethylamine, n-dodecylmethylamine, n-tridecylmethylamine, isotridecylmethylamine, n-tetradecylmethylamine, n-pentadecylmethylamine, n-hexadecylmethylamine, n-heptadecylmethylamine, n-octadecylmethylamine, n-nonadecylmethylamine and n-eicosylmethylamine.

Such alkyl residues may be derived entirely from petrochemical production, for example technical $C_8$-$C_{15}$ alkyl mixtures, 2-ethylhexyl or 2-propylheptyl, or may entirely or partially be based on renewable raw materials, for example fatty amines such as stearyl amine, oleyl amine or tallow amine may be used as the basis for the alkylamine ethoxylates.

The degree of ethoxylation is usually from 1 to 35 EO units per alkylamine molecule, i.e. the at least on alkylamine ethoxylate comprises from 1 to 35 EO units, preferably from 1.5 to 15 EO units, more preferable from 1.8 to 9 EO units, most preferably from 2 to 6 EO units. The said ethoxylation degree is a statistical value, i.e the alkylamine ethoxylates have normally to be regardes as mixtures of species (homologues) with different numbers of EO units.

In an especially preferred embodiment of the instant invention, the at least one alkylamine ethoxylate comprises at least on linear $C_3$ to $C_{20}$ alkyl chain and from 1 to 35 EO units; more preferably the at least one alkylamine ethoxylate comprises at least on linear $C_6$ to $C_{13}$ alkyl chain and from 1.5 to 15 EO units; most preferably the at least one alkylamine ethoxylate comprises at least one linear $C_7$ to $C_{12}$ alkyl chain and from 1.8 to 9 EO units, especially the at least one alkylamine ethoxylate comprises at least one linear $C_8$ to $C_{11}$ alkyl chain and from 2 to 6 EO units.

Such alkylamine ethoxylates may be primary amines with one oxyethylene chain of general formula Alkyl-NH—$(CH_2CH_2O)_m$—H or primary amines with two oxyethylene chains of general formula Alkyl-N[$(CH_2CH_2O)_p$—H][$(CH_2CH_2O)_q$—H] or secondary amines of general formula $(Alkyl)_2$N—$(CH_2CH_2O)_m$—H or mixtures of such primary amines with one oxyethylene chain and such primary amines with two oxyethylene chains or mixtures of such primary and secondary amines, wherein m and (p+q), respectively, are the total ethoxylation degrees. Residual alkylamine species may also be present in lower amounts, especially with low total ethoxylation degrees below 2.

A typical suitable alkylamine ethoxylate is octylamine (caprylamine) with 2 EO units which is commercially available.

The said alkylamine ethoxylates can be prepared by usual methods such as the reaction of the alkylamine with ethylene oxide under catalysis by alkali metal hydroxides or under catalysis by double metal cyanides, as known to the skilled person in the art.

Other surfactants may be present in addition to the alkylamine ethoxylates, for example the surfactants as listed in European application File No. 10190743.4. Additional surfactants may be of anionic, cationic or nonionic nature.

Particularly suitable as additional surfactants are nonionic surfactants based on polyethers or polyalkylene oxides. Apart from unmixed polyalkylene oxides, preferably $C_2$-$C_4$-alkylene oxides and phenyl-substituted $C_2$-$C_4$-alkylene oxides, in particular polyethylene oxides, polypropylene oxides and poly(phenylethylene oxides), block copolymers, in particular polymers comprising polypropylene oxide and polyethylene oxide blocks or poly(phenylethylene oxide) and polyethylene oxide blocks, and also random copolymers of these alkylene oxides are suitable here.

These polyalkylene oxides can be prepared by polyaddition of the alkylene oxides onto starter molecules such as saturated or unsaturated aliphatic and aromatic alcohols, saturated or unsaturated aliphatic and aromatic amines, saturated or unsaturated aliphatic carboxylic acids and carboxamides, polyalkylene oxides based on aliphatic amines being different from the alkylamine ethoxylates as described above. It is usual to use from 1 to 300 moles, preferably from 3 to 150 moles, of alkylene oxide per mole of starter molecule.

Suitable aliphatic alcohols generally have from 6 to 26 carbon atoms, preferably from 8 to 18 carbon atoms, and can have an unbranched, branched or cyclic structure. Examples which may be mentioned are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptylundecanol, 2-octyldecanol, 2-nonyltridecanol, 2-decyltetradecanol, oleyl alcohol and 9-octadecenol and also mixtures of these alcohols, e.g. $C_8$/$C_{10}$-, $C_{13}$/$C_{15}$- and $C_{16}$/$C_{18}$-alcohols, and cyclopentanol and cyclohexanol. The saturated and unsaturated fatty alcohols obtained by fat dissociation and reduction from natural raw materials and the synthetic fatty alcohols from the oxo process are of particular interest. The alkylene oxide adducts of these alcohols usually have average molecular weights $M_n$ of from 200 to 5,000.

As examples of the above aromatic alcohols, mention may be made of not only unsubstituted phenol and α- and β-naphthol but also the alkyl-substituted products which are, in particular, substituted by $C_1$-$C_{12}$-alkyl, preferably $C_4$-$C_{12}$- or $C_1$-$C_4$-alkyl, e.g. hexylphenol, heptylphenol, octylphenol, nonylphenol, isononylphenol, undecylphenol, dodecylphenol, dibutylphenol and tributylphenol and dinonylphenol, and also bisphenol A and its reaction products with styrene, especially bisphenol A substituted in the ortho positions relative to the two OH groups by a total of 4 phenyl-1-ethyl radicals.

Suitable aliphatic amines correspond to the abovementioned aliphatic alcohols. The saturated and unsaturated fatty amines which preferably have from 14 to 20 carbon atoms are also of particular importance here. Examples of aromatic amines are aniline and derivatives thereof.

Suitable aliphatic carboxylic acids are, in particular, saturated and unsaturated fatty acids which preferably comprise from 14 to 20 carbon atoms and hydrogenated, partially hydrogenated and unhydrogenated resin acids and also polybasic carboxylic acids, e.g. dicarboxylic acids such as maleic acid.

Suitable carboxamides are derived from these carboxylic acids.

Apart from the alkylene oxide adducts of the monofunctional amines and alcohols, the alkylene oxide adducts with at least bifunctional amines and alcohols are of very particular interest.

As at least bifunctional amines, preference is given to bifunctional to pentafunctional amines which correspond, in particular, to the formula $H_2N—(R^1—NR^2)_n—H$ ($R^1=C_2$-$C_6$-alkylene; $R^2$=hydrogen or $C_1$-$C_6$-alkyl; n=1 to 5). Specific examples are ethylenediamine, diethylenetriamine, triethylenetetramine, tetraethylenepentamine, 1,3-propylenediamine, dipropylenetriamine, 3-amino-1-ethylenaminopropane, hexamethylenediamine, dihexamethylenetriamine, 1,6-bis(3-aminopropylamino) hexane and N-methyldipropylenetriamine, with hexamethylenediamine and diethylenetriamine being particularly preferred and ethylenediamine being very particularly preferred.

These amines are preferably firstly reacted with propylene oxide and subsequently with ethylene oxide. The ethylene oxide content of the block copolymers is usually from about 10 to 90% by weight.

The block copolymers based on polyfunctional amines generally have average molecular weights $M_n$ of from 1,000 to 40,000, preferably from 1,500 to 30,000.

Bifunctional to pentafunctional alcohols are preferred as at least bifunctional alcohols. Examples which may be mentioned are $C_2$-$C_6$-alkylene glycols and the corresponding dialkylene and polyalkylene glycols, e.g. ethylene glycol, 1,2- and 1,3-propylene glycol, 1,2- and 1,4-butylene glycol, 1,6-hexylene glycol, dipropylene glycol and polyethylene glycol, glycerol and pentaerythritol, with ethylene glycol and polyethylene glycol being particularly preferred and propylene glycol and dipropylene glycol being very particularly preferred.

Particularly preferred alkylene oxide adducts of at least bifunctional alcohols have a central polypropylene oxide block, i.e. are derived from a propylene glycol or polypropylene glycol which is firstly reacted with further propylene oxide and then with ethylene oxide. The ethylene oxide content of the block copolymers is usually from 10 to 90% by weight.

The block copolymers based on polyhydric alcohols generally have average molecular weights $M_n$ of from 1,000 to 20,000, preferably from 1,000 to 15,000.

Such alkylene oxide block copolymers are known and are commercially available, for example, under the names Tetronic®, Pluronic® and Pluriol® (BASF) and also Atlas® (Uniquema).

If surfactants which display strong foaming are used, it is possible to counter this property by use of antifoams.

Surfactant and polyacrylate thickener, if present, are to be viewed as a system. They undergo an interaction which may result in non-Newtonian properties. Within certain limits, surfactant and polyacrylate can partly either supplement or replace one another.

The amount of polyacrylate used in a polyacrylate/surfactant thickener system depends on the use. When the vapor space anticorrosive composition of the invention is used as engine run-in composition, the vapor space anticorrosive composition generally comprises from 0.0001 to 0.3% by weight of polyacrylate, preferably from 0.001 to 0.2% by weight, particularly preferably from 0.003 to 0.15% by weight, in particular from 0.004 to 0.03% by weight and very particularly preferably from 0.005 to 0.015% by weight.

Depending on their specific use, vapor space anticorrosive compositions according to the instant invention can comprise further constituents. These can be, for example, antifoams, dyes or markers.

Suitable thickeners are frequently completely water-dispersible or water-soluble compounds. According to the invention, it is possible to use only one type of thickener or mixtures of various thickeners.

The amount of thickener used depends on the specific use. When the vapor space anticorrosive compositions are used as engine run-in compositions, the vapor space anticorrosive composition generally comprises from 0.0001 to 0.3% by weight of thickener, preferably from 0.001 to 0.2% by weight, particularly preferably from 0.003 to 0.15% by weight, in particular from 0.004 to 0.03% by weight and very particularly preferably from 0.005 to 0.015% by weight.

Vapor space anticorrosive compositions according to the invention have, for example, viscosities (determined as specified in ASTM D 4016-08 at a temperature of 0° C.) of from 5 to 2000 mPas, preferably from 10 to 1000 mPas, particularly preferably from ≥25 to 750 mPas. In some embodiments, vapor space anticorrosive compositions according to the invention have viscosities of from 50 to 500 mPas.

In one embodiment of the invention, vapor space anticorrosive compositions according to the invention have non-Newtonian properties. Non-Newtonian liquids have, at constant temperature, different viscosities at different shear stresses. For example, the dynamic viscosity determined as specified in ASTM D 4016-08 can differ by at least 20% at different spindle speeds. This phenomenon is also referred to as pseudoplasticity.

Vapor space anticorrosive compositions according to the invention having non-Newtonian properties generally have viscosities at 0° C. of from 5 to 1000 mPas at a shear stress corresponding to 12 spindle revolutions per minute. The dynamic viscosity is preferably from 10 to 500 mPas, particularly preferably from 20 to 400 mPas. (Dynamic viscosity determined as specified in ASTM D 4016-08, Brookfield LV DV III+ viscometer having a small sample adapter and a type SC4-34 spindle). The dynamic viscosity of the vapor space anticorrosive composition having non-Newtonian properties at a high shear stress is below that at a lower shear stress.

For example, the dynamic viscosity measured by a method analogous to ASTM D 4016-08 on a Brookfield viscometer at a stirrer speed of 30 revolutions per minute can be at least 5% below that at a stirrer speed of 12 rpm under otherwise identical boundary conditions. The viscosity at the higher shear stress mentioned is preferably at least 10% below that at a lower shear stress, particularly preferably at least 20%, in particular at least 50%.

At 0° C. and energy inputs corresponding to 12 and 30 spindle revolutions (Brookfield LV DV III+ viscometer with small sample adapter and a type SC4-34 spindle, analogous to ASTM D 4016-08), the difference in the viscosity is generally at least 1 mPas, preferably at least 2 mPas, particularly preferably at least 5 mPas and in particular at least 10 mPas. In one embodiment, the difference in the viscosities is at least 15 mPas.

The difference in the viscosities at different shear stresses depends, inter alia, on the temperature and on the two shear rates at which the viscosity is measured. In general, the difference in the viscosity is greater, the greater the difference in the shear stresses.

The constituents mentioned are frequently dissolved or dispersed in one or more solvents such as in water and/or in antifreeze alcohols selected from alkanols, glycols, polyalkylene glycols and glycerol. In many cases, these solvents make up the major proportion by weight of the vapor space anticorrosive composition formulation.

Particularly when the vapor space anticorrosive compositions of the invention are used as coolant or as engine run-in composition, they comprise a large proportion of an antifreeze alcohol or a mixture of antifreeze alcohols. Typical antifreeze alcohols are ethylene glycol, diethylene glycol, triethylene glycol, propylene glycol, dipropylene glycol, tripropylene glycol, glycerol, ethanol, isopropanol, n-propanol, tert-butanol, isobutanol, n-butanol, pentanol and polyethylene glycols which can optionally be etherified at one end. Water may also be present in low or large portions.

It is possible to add all or part of the water and/or of the antifreeze alcohols to the mixture only immediately before use. In this case, concentrates which naturally can have proportions by weight of corrosion inhibitors and thickeners which are orders of magnitude higher are present beforehand.

If the vapor space anticorrosive compositions of the invention comprise water, this can have a neutral, acidic or basic pH. The pH of the mixture is frequently set to a slightly basic value at the end. Typical vapor space anticorrosive compositions have a pH of from 7 to 10, preferably from 7.5 to 9.5, particularly preferably from 8 to 9.

In an embodiment of the invention, vapor space anticorrosive compositions according to the invention have thixotropic properties, i.e. their viscosity alters during application of shear stress. For example, it is possible for the viscosity of a vapor space anticorrosive composition to decrease under shear stress only after some time, for example after a few seconds to minutes.

Subject matter of the instant invention is also a vapor space anticorrosive composition formulation having a relatively high portion of antifreeze alcohols and a relatively low portion of water as solvents; i.e. comprising from 0.01 to 5% by weight, preferably from 0.1 to 3% by weight, of one or more alkylamine alkoxylates as at least one surfactant, from 0.01 to 10% by weight, preferably from 0.5 to 7% by weight, of one or more corrosion inhibitors, from 0 to 0.3% by weight, preferably from 0.0001 to 0.15% by weight, of one or more thickeners, from 75 to 99% by weight, preferably from 80 to 95% by weight, of one or more antifreeze alcohols selected from alkanols, glycols, polyalkylene glycols and glycerol, and 0 to 24% by weight, preferably from 4 to 15% by weight, of water. For the avoidance of doubt, all constituents of the said formulation add up to 100% by weight in each case.

In one embodiment of the invention, a vapor space anticorrosive composition formulation according to the instant invention comprises as corrosion inhibitors from 0.01 to 5% by weight of a castor oil ethoxylate, from 0 to 4% by weight of a triazole such as tolutriazole, from 0 to 5% by weight of a benzoate such as sodium benzoate and from 0 to 5% by weight of carboxylic acids such as isononanoic acid or dicarboxylic acids such as dodecanedicarboxylic acid or phthalic acid or their anhydrides, with the proviso that the vapor space anticorrosive composition formulation comprises a total of at least 0.5% by weight of such corrosion inhibitors but does not exceed 10% by weight. Furthermore, a vapor space anticorrosive composition formulation of this embodiment comprises from 0 to 0.01% by weight of an antifoam, from 0.0001 to 0.3% by weight of a thickener based on a polyacrylate, from 0.1 to 3% by weight of an alkylamine ethoxylate as surfactant, from 20 to 95% by weight of monopropylene glycol and also potassium hydroxide to adjust the pH of the vapor space anticorrosive composition to from 8 to 10. Furthermore, the vapor space anticorrosive composition formulation comprises water. The mixture obtained in this way can be diluted with water for use and to the desired viscosity for storage and the desired freezing point (freezing protection) can be set.

Subject matter of the instant invention is also a process of manufacturing an engine run-in composition or a coolant by mixing the above vapor space anticorrosive composition formulation with water resulting in an engine run-in composition or a coolant, respectively, with a final water content of at least 50% by weight, preferably of at least 70% by weight, especially of at least 90% by weight.

Vapor space anticorrosive compositions according to the invention are suitable, inter alia, as anticorrosive compositions for metal objects. They are suitable for all metals or alloys used industrially e.g. copper, brass, soft solder, steel, magnesium or aluminum.

In particular, vapor space anticorrosive compositions according to the invention display vapor-phase corrosion-inhibiting properties.

In a preferred embodiment, they are used as coolant which additionally has corrosion-inhibiting properties.

Vapor space anticorrosive compositions according to the invention are suitable for corrosion protection of objects from all fields of technology, for example chemistry, chemical process engineering, vehicle construction, food technology, electrical engineering. They are particularly suitable for all objects which have a hollow space.

In a preferred embodiment, they are used as engine run-in compositions, particularly preferably in the case of internal combustion engines such as spark ignition engines, diesel engines, Wankel engines and turbines.

Vapor space anticorrosive compositions according to the invention are also suitable for corrosion protection of all objects which are not continually in use. During periods in which they are not used, these objects are frequently exposed to air, water and weathering and corrode.

Furthermore, vapor space anticorrosive compositions according to the invention are suitable for all apparatuses having mechanically moving parts. Examples are pumps, mechanical conveyors, extruders, medical instruments, fountains, ice machines and brakes.

EXPERIMENTAL PART

Example No. 1

Vapor Space Anticorrosive Composition Formulation According to the Invention

| Constituent | Proportion [% by wt.] |
| --- | --- |
| commercially available octylamine ethoxylate with 2 EO units | 1.80 |
| Isononanoic acid | 2.60 |
| Dodecanedioic acid | 1.00 |
| Phthalic anhydride | 0.257 |
| Tolutriazole | 0.20 |
| Sodium benzoate | 1.00 |
| Potassium hydroxide, 48% in water | 1.60 |
| Monopropylene glycol | 82.352 |
| Anionic polyacrylate, pulverulent, synthetic thickener for pigment printing having a pH as 1% strength solution | 0.020 |

-continued

| Constituent | Proportion [% by wt.] |
|---|---|
| in water of 6 and a solubility in water of >100 g/l at 20° C. (Lutexal ® GP ECO) | |
| Ethoxylated castor oil (C16-C18, average degree of ethoxylation of from 5 to 60 EO) having a pH as 1% strength solution in water of 6.3 (Leunapon ® ER 40) | 0.600 |
| Water | Balance |

Example No. 2

Engine Run-in Composition According to the Invention 5 parts by weight of the vapor space anticorrosive composition formulation of Example 1 were mixed with 95 parts by weight of water.

Example No. 3

Engine Run-in Composition without Alkylamine Ethoxylates for Comparison

| Constituent | Proportion [% by wt.] |
|---|---|
| Triethanolamine | 1.75 |
| Phthalic anhydride | 0.129 |
| Potassium hydroxide, 48% in water | 1.60 |
| Monopropylene glycol | 0.369 |
| Isononanoic acid | 1.30 |
| Benzotriazole | 0.05 |
| Tolutriazole | 0.05 |
| Sodium benzoate | 0.50 |
| Dodecanedioic acid | 0.50 |
| Block copolymer comprising a central polypropylene block having an average mass of 3250 g/mol and at each end a block of polyethylene oxide and having an average proportion of polyethylene oxide of 10% by weight in the molecule (Pluronic ® PE 10100) | 0.0015 |
| Ethoxylated castor oil (C16-C18, average degree of ethoxylation from 5 to 60 EO) having a pH as 1% strength solution in water of 6.3 (Leunapon ® ER 40) | 0.50 |
| Water | Balance |

Example No. 4

Engine Run-in Composition without Alkylamine Ethoxylates for Comparison

| Constituent | Proportion [% by wt.] |
|---|---|
| Triethanolamine | 1.700 |
| Tolutriazole | 0.034 |
| Water | Balance |

Example No. 5

Evaluation of the Vapor Space Anticorrosive Compositions in the Hot and Humid Chamber Test Using a Method Based on DIN 50017

Test plates made of CK 15 (an iron material of structural steel having the material number 1.1141 in accordance with DIN 17210) and having a size of 100×50×3 mm were cleaned and degreased by means of acetone. They were subsequently polished by means of a textile roll on a grinding machine. They were subsequently cleaned again with a cloth moistened with acetone.

A hot and humid chamber model KB 300 from Liebisch (model No. 43046101) was cleaned and filled with 4000 ml of twice-distilled water. The test plates were stood in 400 ml glass beakers, completely covered with the vapor space anticorrosive composition formulations or engine run-in compositions, respectively, and the glass beakers were each covered with a clock glass. The formulations or compositions to be tested were heated to boiling with the test plates in the glass beaker and subsequently allowed to cool covered for one hour. After cooling, the plates were taken from the formulations or compositions and hung up to dry.

The test plates were subsequently suspended in the hot and humid chamber and subjected to the following conditions: A cycle comprised 8 hours at 40° C. and 16 hours at room temperature (21° C.) and 100% relative atmospheric humidity. Five cycles were carried out in succession. The test plates were subsequently taken out, dried and evaluated.

Here, the plates were compared visually relative to one another according to the degree of corrosion. Here, 1 is the best evaluation (no corrosion) and 4 is the worst (severe corrosion).

| Formulation or composition according to Example No. | Evaluation |
|---|---|
| 1 (according to the invention) | 1 |
| 2 (according to the invention) | 2 |
| 3 (for comparison) | 3 |
| 4 (for comparison) | 4 |

The invention claimed is:

1. A vapor space anticorrosive coolant composition, comprising
 a corrosion inhibitor, and
 a surfactant,
 wherein
 the surfactant is an alkylamine ethoxylate comprising a $C_3$ to $C_{20}$ alkyl chain and from 1 to 35 ethylene oxide units, and
 the corrosion inhibitor is an ethoxylate of castor oil.

2. The vapor space anticorrosive coolant composition according to claim 1, wherein the alkylamine ethoxylate comprises a linear $C_7$ to $C_{12}$ alkyl chain and from 1.8 to 9 ethylene oxide units.

3. The vapor space anticorrosive coolant composition according to claim 1, further comprising
 a thickener.

4. The vapor space anticorrosive coolant composition according to claim 3, wherein the thickener comprises a polyacrylate.

5. A vapor space anticorrosive coolant composition formulation, comprising
 from 0.01 to 5% by weight of one or more alkylamine alkoxylates comprising a $C_3$ to $C_{20}$ alkyl chain and from 1 to 35 ethylene oxide units as at least one surfactant,
 from 0.01 to 10% by weight of one or more ethoxylates of castor oil as at least one corrosion inhibitor,
 from 0 to 0.3% by weight of one or more thickeners, from 75 to 99% by weight of one or more antifreeze alcohols selected from the group consisting of an alkanol, a glycol, a polyalkylene glycol, and glycerol, and from 0 to 24% by weight of water.

6. A process of manufacturing an engine run-in composition or a coolant, the process comprising mixing the vapor space anticorrosive coolant composition formulation according to claim 5 with water to obtain the engine run-in composition or the coolant, respectively, with a final water content of at least 50% by weight.

* * * * *